(12) United States Patent
Bleisch

(10) Patent No.: US 10,907,623 B2
(45) Date of Patent: Feb. 2, 2021

(54) CAM MECHANISM FOR THE IMPLEMENTATION OF A VARIABLE STROKE

(71) Applicant: KNAUER Wissenschaftliche Geräte GmbH, Berlin (DE)

(72) Inventor: Julian Emanuel Bleisch, Berlin (DE)

(73) Assignee: KNAUER Wissenschaftliche Geräte GmbH, Berlin (DE)

( * ) Notice: Subject to any disclaimer, the term of this patent is extended or adjusted under 35 U.S.C. 154(b) by 66 days.

(21) Appl. No.: 15/831,473

(22) Filed: Dec. 5, 2017

(65) Prior Publication Data

US 2018/0163710 A1 Jun. 14, 2018

(30) Foreign Application Priority Data

Dec. 8, 2016 (EP) ..................... 16202864

(51) Int. Cl.
*F04B 9/04* (2006.01)
*F04B 1/0408* (2020.01)
(Continued)

(52) U.S. Cl.
CPC ............ *F04B 9/042* (2013.01); *F04B 1/0408* (2013.01); *F04B 1/0413* (2013.01);
(Continued)

(58) Field of Classification Search
CPC ...... F04B 9/042; F04B 1/0413; F04B 1/0408; F04B 1/0472; F04B 1/053; F16H 25/125;
(Continued)

(56) References Cited

U.S. PATENT DOCUMENTS 2,249,951 A 7/1941 Fulton
3,073,246 A 1/1963 Saunders et al.
(Continued)

FOREIGN PATENT DOCUMENTS

DE 527 074 C 6/1931
DE 2602782 A1 * 9/1976 ............. F04B 9/042
(Continued)

OTHER PUBLICATIONS

EPO Translation of the Description of DE 102008019072 B3, Schloderer, Dec. 31, 2009. (Year: 2019).*
(Continued)

*Primary Examiner* — Daniel D Yabut
(74) *Attorney, Agent, or Firm* — Wolf, Greenfield & Sacks, P.C.

(57) ABSTRACT

A cam mechanism for converting a swiveling movement of a drive-side shaft into a linear output movement. A cam disk is attached to the drive-side shaft, a slider is shiftable in a linear guide, and a cam follower is applied against the circumferential surface of the cam disk. Swiveling movement of the cam disk leads to a linear output movement of the slider in the linear guide. The circumference of the cam disk is spiral-shaped at least in sections, and the radius of the cam disk increases monotonically in the spiral-shaped section from a start radius to an end radius along a swiveling direction. By selecting two reversal points within the spiral-shaped section, the setting of a variable stroke can occur. A piston pump is provided with the cam mechanism and a method is provided for using the cam mechanism and the piston pump.

20 Claims, 7 Drawing Sheets

(51) Int. Cl.
*F04B 1/0413* (2020.01)
*F04B 1/0439* (2020.01)
*F04B 1/053* (2020.01)
*F04B 17/03* (2006.01)
*F16H 25/14* (2006.01)
*F16H 25/18* (2006.01)
*F16H 53/02* (2006.01)
*F16H 53/06* (2006.01)
*F04B 53/14* (2006.01)

(52) U.S. Cl.
CPC ............ *F04B 1/0439* (2013.01); *F04B 1/053* (2013.01); *F04B 17/03* (2013.01); *F16H 25/14* (2013.01); *F16H 25/18* (2013.01); *F16H 53/025* (2013.01); *F16H 53/06* (2013.01); *F04B 53/14* (2013.01)

(58) Field of Classification Search
CPC .......... F16H 25/14; F16H 25/18; F16H 53/06; F16H 53/025
See application file for complete search history.

(56) References Cited

U.S. PATENT DOCUMENTS

| | | | | |
|---|---|---|---|---|
| 4,028,018 A | * | 6/1977 | Audsley | F04B 1/0439 417/534 |
| 4,598,672 A | * | 7/1986 | Jayne | F01B 9/023 123/197.4 |
| 5,151,015 A | * | 9/1992 | Bauer | F04B 9/042 417/18 |
| 5,647,308 A | * | 7/1997 | Biagini | F01B 9/06 123/56.2 |
| 7,681,490 B2 | * | 3/2010 | Alaze | B60T 8/4031 91/491 |
| 9,080,653 B2 | * | 7/2015 | Suzuki | F01L 13/00 |
| 2009/0092511 A1 | * | 4/2009 | Jiang | F04B 9/042 417/539 |
| 2009/0123304 A1 | * | 5/2009 | Alaze | B60T 8/4031 417/273 |
| 2014/0041622 A1 | * | 2/2014 | Yoshizawa | F04B 9/04 123/197.4 |

FOREIGN PATENT DOCUMENTS

| | | | | |
|---|---|---|---|---|
| DE | 10 2008 019072 B3 | 12/2009 | | |
| SU | 1657751 A1 | 6/1991 | | |
| WO | WO 2006/057018 A1 | 6/2006 | | |
| WO | WO-2016188732 A1 | * | 12/2016 | ............ F16H 25/18 |
| WO | WO-2018177694 A1 | * | 10/2018 | ............ F04B 1/053 |

OTHER PUBLICATIONS

EPO Translation of the Description of EP 286792 A2, Siller, Oct. 19, 1988. (Year: 2019).*
Extended European Search Report for European Application No. 16202864.1, dated Jun. 1, 2017.
EP16202864.1, Jun. 1, 2017, Extended European Search Report.

* cited by examiner

CAM MECHANISM FOR THE IMPLEMENTATION OF A VARIABLE STROKE

CROSS REFERENCE TO RELATED APPLICATIONS

This Application claims priority to European Patent Application 16202864.1, filed Dec. 8, 2016, and entitled "Cam Mechanism For The Implementation Of A Variable Stroke", which is incorporated herein by reference.

The invention relates to a cam mechanism for converting a swiveling movement of a drive-side shaft into a linear output movement, comprising a cam disk which can be attached to the drive-side shaft, a slider which can be shifted at least in sections in a linear guide, and a cam follower which is applied against the circumferential surface of the cam disk, so that a swiveling movement of the cam disk leads to a linear output movement of the slider in the linear guide, wherein the circumference of the cam disk is designed as spiral-shaped at least in sections, and the radius of the cam disk increases monotonically in the spiral-shaped section from a start radius $R_1$ to an end radius $R_2$ along a swiveling direction. By selecting two reversal points within the spiral-shaped section, the setting of a variable stroke can occur. The invention further relates to a piston pump with such a cam mechanism as well as to a method for using the cam mechanism and the piston pump.

PRIOR ART AND BACKGROUND

In liquid chromatography, substances are separated based on the physicochemical interactions between mobile and stationary phase. In the process, the substance to be separated is pumped together with an eluent through the stationary phase. For the generation of the liquid flow required for this purpose, piston pumps are usually used in the prior art. The reduction of the particle sizes of the stationary phase to 2.2 to 1.7 µm leads to a speed and efficiency increase in ultra high-performance liquid chromatography (UHPLC). Reduction of the analysis time in connection with increased work pressure means an increased demand for accuracy and precision of the high-performance pumps.

Usually, piston pumps consist of a cylinder in which a piston as liquid displacement device is moved linearly. In order to drive a piston pump by means of a rotating motor, it is therefore necessary to convert a rotation movement into a linear movement.

For this purpose, it is known to use cam mechanisms. Here, the usually uniform rotation movement of a motor is transmitted to a cam disk. The rotation of the cam disk is transferred to a cam follower which is connected to linearly guided output elements or sliders. Depending on the shape of the margin of the cam disk, the rotation movement of the cam disk is converted into a linear movement of the slider and thus of the piston.

In DE 10 2008 019 072 A1, a cam mechanism for driving a piston pump for high performance liquid chromatography is disclosed. In the cam mechanism, the position and the geometry of the cam disk in relation to the cam follower and the force exertion axis onto a linearly guided slider is selected in such a manner that a transverse force always presses the slider onto a defined guide surface. As a result, a reduction of the freedom of play of the slider can be ensured. However, the disadvantage of the cam mechanism is the expensive construction which results from limiting requisites for the arrangement and geometry of the components. Moreover, by means of the cam mechanism, only a fixed stroke can be implemented, which results from the shape of the margin during a complete revolution of the cam disk.

Although it is known to generate, with the help of ball screws, a variable stroke on a linearly guided slider, which results from the number of revolutions of the thread for the respective forward and backward movement. However, ball screws are cost intensive in terms of procurement and require a high geometric precision of the construction in which they are installed. This relates to the reception, the guiding as well as the motor connection. Moreover, due to the high inertia of a ball screw, a greater torque is needed for the acceleration.

AIM OF THE INVENTION

The aim of the invention was to provide a method and a device which eliminate the disadvantages of the prior art. In particular, an aim of the invention was to provide a cam mechanism and a piston pump enabling the setting of a variable stroke with at the same time the most play-free possible guiding of the slider. Moreover, the aim was for the cam mechanism and the piston pump to be characterized by a simple, robust design and a high tolerance with regard to manufacturing variations.

SUMMARY OF THE INVENTION

The aim of the invention is achieved by the independent claims. The dependent claims relate to preferred embodiments of the invention.

In a preferred embodiment, the invention relates to a cam mechanism for converting a swiveling movement of a drive-side shaft into a linear output movement, comprising a) a cam disk that can be attached to the drive-side shaft, b) a slider that can be shifted in a linear guide at least in sections, and c) a cam follower which is applied against the circumferential surface of the cam disk, so that a swiveling movement of the cam disk leads to a linear output movement of the slider in the linear guide, wherein the circumference of the cam disk is designed as spiral-shaped at least in sections, and the radius of the cam disk increases monotonically in the spiral-shaped section from a start radius $R_1$ to an end radius $R_2$ along a swiveling direction.

According to the preamble in question, the cam mechanism enables the converting of a rotation movement into a linear output. For this purpose, the cam mechanism can be fastened to the drive-side shaft which is connected to a motor. The motor sets the drive-side shaft in rotation, so that the cam disk fastened thereto rotates in accordance with the rotation of the shaft. The rotation axis of the cam disk preferably coincides with the drive shaft. The rotation movement of the cam disk is taken up by a cam follower which, for this purpose, is applied against the cam disk. I.e., during the rotation of the cam disk, said cam disk is preferably in direct contact with the cam follower. The cam follower is coupled to the front end of a slider which can move axially in a linear guide. The rotation axis of the cam disk, on the other hand, is preferably stationary with respect to the linear guide. According to the shape of the margin of the rotating cam disk, the slider is accordingly moved axially within the linear guide.

In the sense of the invention, the circumference of the cam disk designates the shape of the margin of the cam disk. According to the invention, the circumference of the curve disk formed as spiral-shaped at least in sections. The spiral-shaped geometry of the circumference preferably relates to the radial distance of the margin of the cam disk from the rotation axis of the cam disk. Therefore, "spiral-shaped section" preferably is understood to mean a section of the cam disk which is characterized by a continuously monotonically increasing radial distance of the margin of the cam disk from the rotation axis with increase of the rotation angle.

Particularly preferably, the radius in the spiral-shaped section increases strictly monotonically with the rotation angle in a rotation direction from the start of the spiral-shaped section to the end of the spiral-shaped section. In the radial section, the margin of the cam disk preferably behaves, preferably at least in sections, as a spiral which increases from the rotation axis in direction of the swiveling angle. Preferably, the spirals are indicated by polar coordinates. For example, arithmetic spirals are characterized by a linear increase of the radius. Other spiral shapes concern, for example, hyperbolic spirals or logarithmic spirals. The person skilled in the art recognizes that the behavior of the margin of the cam disk in sections as a spiral relates to the monotonically continuous increase of the radius and does not refer to spiral shapes having swiveling angles of more than 360°.

In the sense of the invention, the start radius $R_1$ preferably denotes the radial distance of the margin of the cam disk from the rotation axis at the start of the spiral-shaped section. The start radius $R_1$ characterizes the smallest radius in the spiral-shaped section. Therefore, in the cam mechanism, the application of the cam follower on the start of the spiral-shaped section coincides with the maximum retracted position of the slider. During the swiveling movement of the cam disk, the cam follower is guided along the spiral-shaped section. Due to the continuously monotonically increasing circumference of the cam disk, the cam follower and thus the slider perform a continuously monotonic axial extension movement. With a swiveling movement of the cam disk to the end of the spiral-shaped section, the slider reaches the maximum extended position for the cam mechanism. This position corresponds to an application of the cam disk at the end radius $R_2$. In the sense of the invention, the end radius $R_2$ preferably denotes the radial distance of the cam disk from the rotation axis at the end of the spiral-shaped section and corresponds to the largest radius of the spiral-shaped section.

In the sense of the invention, a swiveling movement of the cam disk preferably relates to a turning or rotation of the cam disk between two reversal points, so that the slider performs an oscillating movement between two dead points in the linear guide. By a swiveling movement of the cam disk between the reversal points at the start of the spiral-shaped section ($R_1$) and at the end of the spiral-shaped section ($R_2$), a maximum stroke of the difference between R1 and R2 can be generated. In the sense of the invention, the stroke denotes the distance between the dead points of the slider, i.e., the positions in which the slider switches from an axial extension movement to an axial retraction movement or in the reverse direction. Moreover, the person skilled in the art knows that, in a design of the cam disk with a spiral-shaped section, in which the radius of the cam disk increases from $R_1$ to $R_2$, due to the continuity of the margin of the cam disk, the radius of the circumference decreases in a non-spiral-shaped section from $R_2$ from $R_1$. The cam disk is applied against the cam follower during the swiveling movement preferably exclusively in the spiral-shaped section and not in the non-spiral-shaped section.

While the cam mechanisms of the prior art are always designed only for a fixed stroke corresponding to the difference between the maximum and the minimum radius of the rotation movement, the cam mechanism according to the invention allows a variable setting of the stroke. Due to the continuously monotonic radial increase in the spiral-shaped section, any reversal points of the swiveling movement between the start ($R_1$) and the end ($R_2$) of the spiral-shaped section can be selected. For example, respective reversal positions with radial distances $R_3$ and $R_4$, where $R_1 < R_3 < R_4 < R_2$, can be selected, so that the slider performs an axial movement with a stroke corresponding to the difference between $R_4$ and $R_3$. For this purpose, only the swiveling movement needs to be set, for example, with the aid of an electronically controllable motor, in such a manner that a swiveling movement between the positions is carried out, which respectively correspond to an application of the cam follower against the cam disk with $R_3$ and $R_4$.

With the help of the swivelable cam mechanism according to the invention, it is thus possible to set a desired stroke as variably as possible in a particularly simple manner, for example, in order to drive a piston pump with said stroke. Therefore, using a single cam mechanism, it is possible to implement different strokes of the slider. This can be used particularly advantageously in high performance liquid chromatography in order to optimize to the performance of the piston pump for the substances to be separated and the separation columns.

For an HPLC pump, the cycle time and the stroke are important parameters which decisively influence the regulation and the performance of the pump. Pumps with fixed stroke are optimized for an operating point, and from this the cycle time is determined for a predetermined flow. In the case of large deviations from the operating point, i.e., very small or very large flows, large cycle times or high frequencies result, which makes the regulation difficult or increases equipment wear. A piston pump with a variable stroke enables the independent regulation of cycle time and flow and therefore provides, above all, an optimal performance particularly over large flow ranges.

In addition to high performance liquid chromatography, a cam mechanism with variable stroke can also be applied advantageously in other fields such as, for example, in the operation of reciprocating-piston combustion engines with variable compression.

In a preferred embodiment of the invention, the cam follower is characterized in that the radius of the cam disk in the spiral-shaped section increases linearly with the swiveling angle. In this preferred embodiment, the circumference of the cam disk therefore behaves in sections as an arithmetic spiral which is formed when, in a rotation movement, the radius increases proportionally to the rotation angle. In polar coordinates, the circumference of the cam disk can thus be expressed preferably as $R(\phi)=a*\phi+R_1$. Here, $\phi$ denotes the angular coordinates of the circumference, wherein $\phi_0=0$ corresponds to the start of the spiral-shaped section ($R_1=R(\phi_0)$). Parameter a corresponds to a linear increase, and preferably $a=(R_1-R_2)/\phi_{max}$, where $\phi_{max}$ preferably corresponds to the angular coordinates of the end of the spiral-shaped section. $\phi_{max}$ is thus equal to the maximum swiveling angle in which the cam disk can be rotated within the spiral-shaped section by an application of the cam follower with $R_1$ to $R_2$. Accordingly, $R(\phi_{max})=R_2$.

Due to the linear increase of the cam disk in the spiral-shaped section, a particularly favorable kinematic transfer function of the swiveling movement of a drive shaft can be converted to the linear output of the slider. Thus, in the preferred embodiment, a uniform angular speed of the cam disk or drive shaft is converted into a uniform linear axial movement of the slider. This enables a simpler regulation of the drive motor. Moreover, as a result, non-constant speeds of the slider can also be actuated in a simple way by means of a drive.

However, a particular advantage of this embodiment is that, by means of a linear increase of the radius, uniform dynamics of transverse forces of the slider within the linear guide can be ensured. Thus, in this embodiment, by means of a corresponding positioning of the cam disk with respect to the cam follower or central axis of the slider, it is possible to ensure that a transverse force acts on a preferred area of the linear guide. Thus, it can be preferable, for example, to select the positioning of the components in such a manner that an application of the cam disk onto the cam follower at the start of the spiral-shaped section leads to a transverse force which presses the slider downward at the center onto the linear guide. Advantageously, by means of the linear increase, it is ensured that this transverse force does not change or changes only slightly during the swiveling movement over the spiral-shaped section. The preferred embodiment thus enables a particularly stable and play-free guiding of a slider by a cam mechanism, wherein the stroke of the slider can be set variably.

In a preferred embodiment of the invention, the cam mechanism is characterized in that the difference of $R_2-R_1$ is between 1.5 mm and 50 mm, preferably between 5 mm and 30 mm, and particularly preferably between 10 mm and 20 mm. In this embodiment, depending on the swiveling angle, a stroke of the slider can be set variably up to a maximum of nearly 50 mm. The parameter values are particularly suitable for the operation of piston pumps in high performance liquid chromatography, in which strokes of the slider between preferably 1.5 mm and 50 mm are used. Advantageously, the difference of $R_2-R_1$ can be selected in such a manner that a variable stroke can be set over the desired parameter range. For example, it can be preferable to operate a piston pump with a variable stroke between 20 mm and 40 mm. For this purpose, a difference of $R_2-R_1$ of 40 mm would be particularly suitable. Indeed, a cam disk with a difference of $R_2-R_1$ of 40 mm can also implement clearly smaller strokes of, for example, 2 mm, by means of a correspondingly smaller swiveling angle. However, the actuation and force transfer through the drive shaft with the aid of a motor is more efficient for a given stroke the greater the swiveling angle is. Accordingly, it is particularly preferable to select a difference of $R_2-R_1$ which corresponds to the maximum desired stroke or approximates it. For applications in high performance liquid chromatography, it is particularly preferable to operate a piston pump with a variable stroke of up to about 15 mm. In this case, it is preferable to select a difference of $R_2-R_1$ of approximately 15 mm. In the sense of the invention, the terms "nearly," "about" or "approximately" or synonymous terms are understood to mean preferably a tolerance range of ±10%, particularly preferably of ±5%.

In a preferred embodiment, the invention relates to a cam mechanism, wherein the spiral-shaped section of the cam disk extends over an opening angle between 90° and 340°, preferably between 220° and 330°. In the sense of the invention, the swiveling angle preferably denotes the rotation angle of the cam disk, wherein the maximum swiveling angle for a cam disk corresponds preferably to the opening angle of the spiral-shaped section. I.e., if the start of the spiral-shaped section is at a rotation angle $\phi=0$, at which the cam disk has a radius $R_1$, then the maximum swiveling angle $\phi_{max}$ preferably denotes the rotation angle along the spiral-shaped section in which the radius of the cam disk has increased to $R_2$, that is to say it has reached the end of the spiral-shaped section. The preferred embodiment thus relates to cam disks with a maximum swiveling angle, i.e., an opening angle of the spiral-shaped section between R1 and R2, from 90° to 340°, preferably to 220° to 330°. The higher the maximum swiveling angle is, the smaller the resulting torque on the drive shaft is and the more uniformly and controllably a variable stroke within the spiral-shaped section can be set. On the other hand, the maximum swiveling angle is limited by the diameter of the cam follower. In the case of an opening angle of the linear area which is clearly greater than 340°, the result is a very short non-spiral-shaped section, so that the maximum and the minimum radius of the cam disk R1 and R2 are geometrically close to one another. Due to the extent of the cam follower, when the start of the spiral-shaped section at R1 is engaged with approach of the start of the spiral-shaped section at R1, a collision with the end area of the spiral-shaped section at R2 can therefore occur.

The mentioned parameter ranges and, in particular, a swiveling angle of more than 220°, are thus characterized by the provision of a cam mechanism over a large variable stroke, which can be operated with high precision.

In a preferred embodiment, the invention moreover relates to a cam mechanism, wherein the radius of the cam disk in the spiral-shaped section increases linearly with the swiveling angle, and the linear increase is between 0.005 mm/° and 0.5 mm/°, preferably between 0.02 mm/° and 0.2 mm/°, and most particularly between 0.03 mm/° and 0.08 mm/°. The parameter values preferably correspond to the values for the parameter a for a description of the increase of the margin of the cam disk as a function of the rotation angle $\phi$ according to $R(\phi)=a*\phi+R_1$. Preferably, in the sense of the invention, a linear increase also exists if the local increase $dR(\phi)/d\phi$ is approximately a, i.e., if preferably $dR(\phi)/d\phi$ deviates by not more than ±10% from a constant a over the swiveling angle of the linear section. These values enable a particularly advantageous kinematic transfer function from the cam disk to the slider, wherein transverse forces occurring in the swiveling area are kept constant. Moreover, these parameters are particularly advantageous for the use of the cam mechanism in high performance liquid chromatography, wherein this occurs preferably in combination with the above-mentioned differences of $R_2-R_1$ in a range between 1.5 mm and 50 mm, preferably between 5 mm and 30 mm, and particularly preferably between 10 mm and 20 mm, and with the preferred mentioned opening angles of the spiral-shaped section of 90°-330° and particularly preferably 220°-360°.

In a preferred embodiment of the invention, the cam mechanism is characterized in that the contact surface of the linear guide for receiving the slider and the opposite-shaped matching sliding surface of the slider comprise, in cross section, a narrowing directed toward the central axis. It is preferable that the contact surface and the sliding surface during the guiding of the slider in the linear guide are in full contact without gaps. In the sense of the invention, the central axis preferably denotes that axis in which the slider performs a linear, axial movement within the linear guide. When the cam mechanism is used for driving a piston pump, the central axis preferably corresponds to the axis in which the piston performs a linear movement, due to the coupling to the slider. The central axis is thus preferably the force exertion axis for the slider as driving element. The narrowing of the linear guide, which in cross section is directed toward the central axis, is preferably understood to mean a narrowing with a symmetry plane in the cross section, which coincides with the central axis, so that the narrowing opposes a lateral movement of the slider. The directing of the narrowing toward the central axis thus preferably refers to a lateral or horizontal orientation of the narrowing. It is particularly preferable that the narrowing of the contact surface of the linear guide occurs downward. In the sense of the invention, downward, upward or vertically preferably refer to directions in the cross section of the cam mechanism relative to which the slider is exposed to a transverse force. This can occur, for example, by a break in the symmetry of the arrangement of the positioning of the cam disk relative to the cam follower, wherein the rotation axis of the cam disk is offset with respect to the rotation axis of the cam follower along the vertical direction.

It can also be preferable that, upward, downward or vertically are defined with respect to the force of gravity, wherein the slider, due to its own weight, is exposed to a transverse force towards the contact surface. Particularly preferably, downward refers to the direction relative to which the slider is exposed to the strongest transverse force during the movement in the linear guide. Therefore, it is particularly preferable that the contact surface of the linear guide is present below for receiving the slider.

Lateral or horizontal movements refer to the orthogonal direction relative to upward and downward (vertically), respectively, wherein a movement of the slider forward or backward corresponds to the retraction and extension direction of the slider and is also referred to as axial direction. As a result of the preferred narrowing of the contact surface of the linear guide, the slider is guided in a particularly stable manner in the linear guide. Here, it is particularly preferable to select the force exertion into the slider by means of the cam disk in such a manner that an increased transverse force onto the slider is also exerted towards the narrowing. As a result, the slider is pressed into the narrowing during the axial movement and thus has particularly small lateral play. However, it can also be preferable to select a symmetric arrangement, wherein, for example, the slider is exposed to the force toward the narrowing due to its own gravity and is stabilized thereby.

The preferred embodiment of a narrowed contact surface with corresponding opposite-shaped matched slider enables a movement of the slider in the linear guide with particularly small play. As a result, malfunctions and wear can be reduced.

In addition, guiding the slider on a single contact surface using a narrowing advantageously enables excellent stability. A limitation of the slider in the linear guide by other guide surfaces such as, for example, guide surfaces above or lateral relative to the slider, is preferably not necessary. As a result, the friction surface of the slider with the linear guide can be considerably reduced. In addition, the preferred embodiment represents a particularly simple and cost effective design of a play-free cam mechanism, which, in addition, allows the setting of a variable stroke.

In a preferred embodiment of the invention, the cam mechanism is characterized in that the contact surface of the linear guide for receiving the slider and the opposite-shaped matching sliding surface of the slider are v-shaped in cross section with an angle of preferably between 30° and 170°, particularly preferably between 80°-130°. V-shaped, in the sense of the invention, is understood to mean preferably a narrowing with two surfaces which, like the Roman letter V, converge towards one another and meet at a narrowing point at an angle. Due to the angle of the v-shaped contact surfaces, the lateral play of the slider in the linear guide can advantageously be influenced, wherein the mentioned ranges represent optimized and accordingly preferable solutions. It was recognized that in the case of excessively acute angles, for example, angles of 10° or less, increased pressure exertion onto the lateral surfaces of the v-shaped contact surface as well as of the matching designed sliding surface can occur, as a result of which friction and wear are increased. In the case of an excessively large angle of, for example, 175°, the flat design of the v-shaped surface can result in an increase of the lateral play of the slider in the linear guide. And a clearly increased transverse force onto the linear guide would be necessary in order to continue to guide the slider without lateral play.

The v-shaped contact surface results in a particularly stable guiding, particularly for the mentioned parameters. In particular, tolerances can be effectively compensated thereby, for example, by a lateral asymmetric exertion of the forces. Advantageously, the v-shaped contact surface here ensures that play due to lateral movements is prevented, since the v-shaped sliding surface is also pressed laterally into the contact surface. In the selected geometry, wear is also surprisingly lowered here.

In another preferred embodiment, the invention relates to a cam mechanism, wherein the arrangement of the cam follower, of the cam disk and of the slider is present in such a manner that, for the area of a swiveling movement, while the cam follower is applied against the cam disk in the spiral-shaped section, a radial force A acts from the cam follower onto the cam disk, forming an angle with the axial force B leading to the shifting of the slider, such that a transverse force C presses the slider in the area of the sliding surface vertically downward into the contact surface of the linear guide. The person skilled in the art then knows or can learn by testing and simulation which geometric arrangements meet these force conditions. For example, it can be preferable that the rotation axis of the cam disk coincides with the central axis, i.e., the force exertion axis for the axial force B, whereas the rotation axis of the cam follower is offset upward by a distance $D_1$. As a result, it can be ensured advantageously that the transverse force C exerts onto the slider a vertically downward directed pressure which stabilizes said slider in the linear guide. Likewise, however, it is also possible, for example, to shift the rotation axis of the cam disk with respect to the central axis or force exertion axis upward vertically by a distance $D_2$ and to offset the rotation axis of the cam follower by an additional distance $D_3$ with respect to the rotation axis of the cam disk. By means of such a double offset it is advantageously possible to ensure a transverse force C which presses the slider preferably at the center downward onto the contact surface of the liner guide.

In addition, the change of the transverse force C can preferably be set by the increase of the radius of the cam disk in the spiral-shape section. Here, it is particularly preferable to select a linear increase of the radius with the swiveling angle. In this embodiment, a particularly stably positioned transverse force C can be achieved, which does not move or moves only barely, particularly during the swiveling movement of the cam disk between the reversal points. However, the person skilled in the art recognizes which other shapes of the spiral-shaped section are particularly well-suited for achieving, during the swiveling movement within the spiral-shaped section, that the transverse force C always presses the slider vertically downward into the contact surface.

By means of the preferred embodiment, tilting of the slider can be prevented particularly reliably, tilting which can occur when the transverse force C exerts a torque onto the slider clearly outside of the sliding surface. By means of this embodiment, it is also possible to effectively prevent the slider from being lifted out, as well as other brief mechanical malfunctions in the movement flow of the slider. Thus, by means of this preferred embodiment, a reliable and continuous operation of the cam mechanism and an absence of vertical play are ensured in a particularly effective manner.

In the sense of the invention, a play-free or reduced-play guiding is preferably understood to mean that, even in the case of a small asymmetric force exertion onto the slider, said slider does not move or barely moves out of the guided position. Preferably, the absence of play relates to a lateral and/or vertical movement of the slider. Thus, for example, a vertical shifting of the axial force B onto the slider could lead to a tilting movement. Due to a transverse force C which presses the slider into the linear guide, it is possible to ensure that there is no play along the vertical direction. A vertical play is therefore prevented.

On the other hand, for example, as a result of a lateral shifting of the axial force B onto the slider, a torque of the slider about a vertical axis can occur, leading to a lateral movement of the slider. This is preferably referred to as lateral play. Due to a narrowing of the contact surface of the linear guide for receiving the slider and of the opposite-shaped matching sliding surface of the slider and the transverse force C which presses the slider into the linear guide, lateral play can be prevented particularly reliably.

The advantageous absence of play in addition preferably leads to a reduction of wear on the contacting surfaces of the linear guide and of the slider. An additional advantage is that the absence of play is not influenced negatively by wear. Due to the stabilizing action of the transverse force C, particularly even in the case of occurrence of wear, a play-free guiding of the slider can still be ensured. Wear on the sliding surface could lead, for example, to a lowering of the slider. The stable guiding of the slider would not be affected thereby.

In a preferred embodiment, the invention moreover relates to a cam mechanism, wherein the rotation axis of the cam disk is located in the plane of the central axis of the slider, and the rotation axis of the cam follower is offset vertically upward by a distance $D_1$ relative to the central axis of the slider. Due to this embodiment, by means of simple constructive means, a transverse force C onto the slider can be ensured, pointing vertically downward. Preferably, the distance $D_1$ should be selected in such a manner that the position of the transverse force C is located to the extent possible in the center within the contact surface.

For example, for a cam disk with a linear increase within the spiral-shaped section between 0.03 mm/° and 0.08 mm/° and for implementing a maximum stroke between 10 mm and 20 mm, it can be preferable to select an axial offset $D_1$ between 0.2 mm and 1 mm. This is particularly advantageous in the case of a size of the cam follower between 20 mm and 60 mm and a start radius R1 of the cam disk between 10 mm and 20 mm.

In a preferred embodiment, the invention moreover relates to a cam mechanism, wherein the rotation axis of the cam disk is offset vertically upward by a distance $D_2$ with respect to the central axis of the slider, and the rotation axis of the cam follower is offset vertically upward by a distance $D_3$ with respect to the rotation axis of the cam disk. Also, by means of this doubled axial offset of the cam disk and the cam follower with respect to the central axis of the slider, i.e., preferably with respect to the force exertion axis, a stabilizing transverse force C can advantageously be achieved, which presses the slider vertically downward. The distances $D_2$ and $D_3$ should preferably be selected so that the transverse force C acts centrally within the sliding surfaces.

For example, for a cam disk with a linear increase within the spiral-shaped section between 0.03 mm/° and 0.08 mm/° and for the implementation of a maximum stroke between 10 mm and 20 mm, it can be preferable to select an axial offset $D_2$ between 0.5 mm and 1.5 mm, and for $D_3$ between 0.3 mm and 1.3 mm.

In particular, in connection with a contact surface which has the preferred described narrowing, it is possible, by means of a vertically downward directed transverse force C, to achieve excellent results with respect to a malfunction- and play-free operation of the cam mechanism.

In another preferred embodiment, the invention relates to a piston pump for high performance liquid chromatography comprising a cam mechanism according to the invention or a preferred embodiment thereof and a motor for driving a drive-side shaft which is connected to the cam disk, a control of the motor which is configured so that the cam disk performs a swiveling movement between two reversal points, and a piston which is attached central axially on the end of the slider, on the side facing away from the cam follower. Preferably, the control refers to a control electronics unit which controls the rotation movement of the motor. Various controls are known to the person skilled in the art, for the purpose of setting the rotation movement of the motor in an automated manner so that said motor brings about a swiveling movement of the cam disk between two reversal points. Preferably, the control is configured in such a manner that the reversal points can be set by the user of the piston pump. In accordance with the inventive design of the cam disk, the reversal points can preferably be selected in the area of the spiral-shaped section and as a result enable the setting of a desired stroke of the piston pump over this area. Here, it can be particularly preferable to introduce a transmission between the rotation movement of the motor and the swiveling movement of the cam disk such that the motor has a higher rotation angle than the cam disk. For example, a transmission by a factor of 10 can occur, so that, for a swiveling movement of the cam disk of 270°, the motor performs 7.5 revolutions, i.e. a rotation movement of 2700°, along a direction.

The advantages of the cam drive according to the invention or preferred embodiments thereof, such as the settability of a variable stroke, can thus be exploited particularly for piston pumps in high performance liquid chromatography. The person skilled in the art recognizes that preferred embodiments and advantages that have been disclosed for the cam mechanism can be applied just as well to the piston pump. Thus, for example, also in the piston pump, a narrowing of the receiving surface for the slider, which is pressed by a transverse force into said receiving surface, leads to a particularly steady piston movement and reduced play.

In a preferred embodiment of the invention, the piston pump is characterized in that the motor is positioned parallel to the rotation axis of the cam disk to the rear and offset upward or downward relative to the cam mechanism and preferably lines up precisely with the cam mechanism on one side. Due to the cam mechanism according to the invention, the motor can be set up in a particularly simple manner in this way. In a particularly compact design, due to this positioning of the motor, two cam mechanisms can be operated in parallel, which are constructed mirror symmetrically in parts and in which one motor is offset upward and one motor is offset downward. In particular in the field of high performance liquid chromatography, the resulting simple handling and reduction of the space requirement are advantageous.

In another preferred embodiment, the invention relates to the use of a cam mechanism for driving a piston pump, wherein a swiveling movement of the cam disk between two reversal points is carried out during an application of the cam follower against the cam disk in the spiral-shaped section, so that the piston is shifted linearly between two dead points, wherein, by determination of the reversal points, a predetermined piston stroke is set, which corresponds to the difference of the radius of the cam disk at the first reversal point and the radius of the cam disk at the second reversal point. Therefore, the invention preferably additionally relates to an inventive method for using the cam mechanism, wherein the swiveling movement of the cam disk is selected in such a manner that it brings about a desired stroke of the slider. In the sense of the invention, the terms reversal points preferably denote the angular positions in which the swiveling movement of the cam disk is changed from one rotation direction to the opposite rotation direction. The dead points of the slider correlate with the reversal points of the swiveling movement and thus correspond to the points at which the slider undergoes a change in direction of the linear movement thereof.

The person skilled in the art recognizes that preferred embodiments and advantages which have been disclosed for the cam mechanism are applicable in the same manner to the inventive use of the cam mechanism. The method steps of the use according to the invention thus preferably comprise the provision of preferred embodiments of the cam mechanism. For these embodiments, for example, it was disclosed that a narrowing of the receiving surface for the slider which is pressed by a transverse force into this reception surface leads to a particularly steady movement of the slider. The person skilled in the art recognizes that this embodiment leads to a reduction of the play and to a stable siding movement also in the use according to the invention.

Below, the invention will be explained in further detail in reference to examples, without being limited to them.

DETAILED DESCRIPTION OF THE FIGURES

Figure 1:
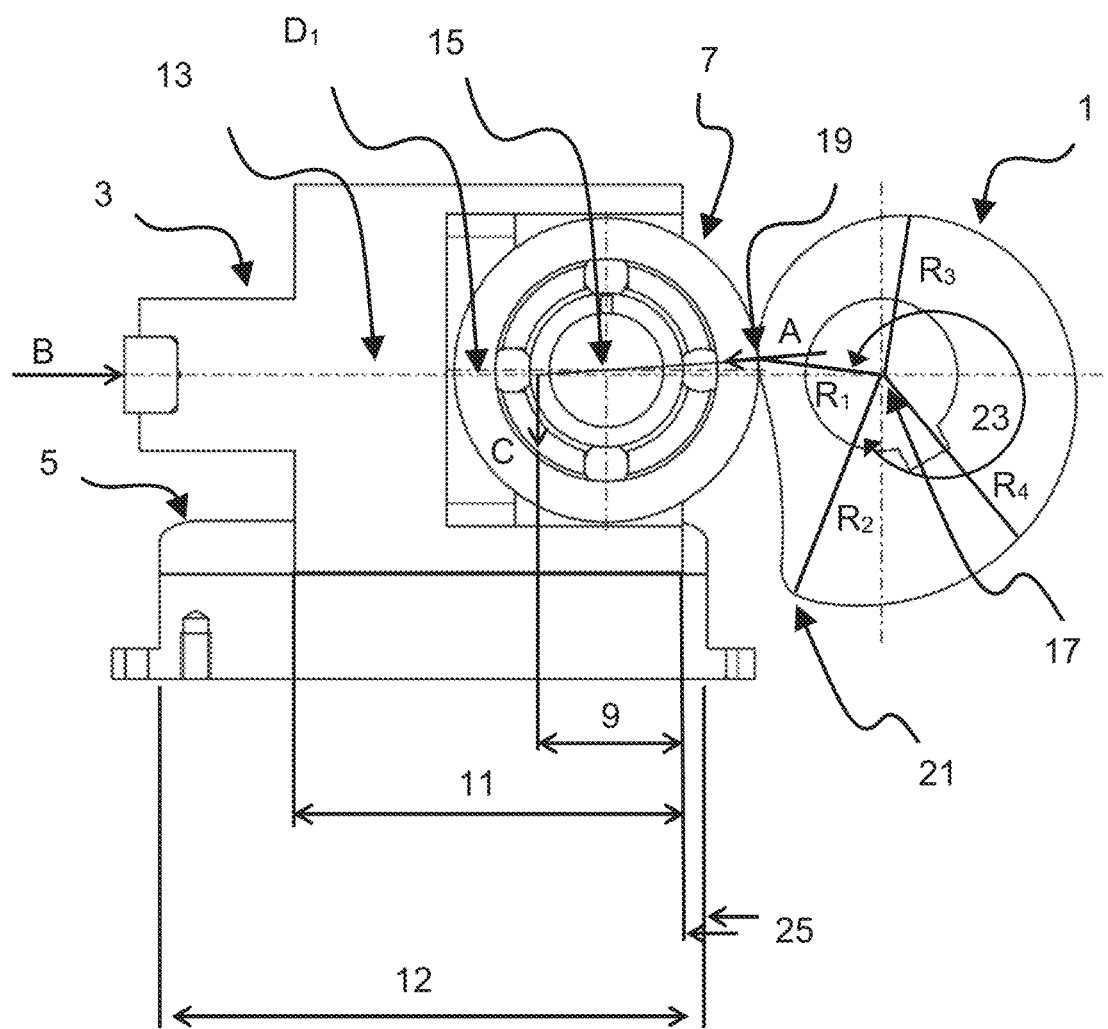
FIG. 1 Diagrammatic representation of a preferred embodiment of the cam mechanism, wherein the slider is in the maximum retracted position FIG. 2 Diagrammatic representation of the preferred embodiment of the cam mechanism according to FIG. 1, wherein the slider is in a half-extended position FIG. 3 Diagrammatic representation of a preferred embodiment of the cam mechanism according to FIG. 1, wherein the slider is in the maximum extended position FIG. 4 Diagrammatic representation of a preferred embodiment of the cam mechanism, wherein the rotation axis of the cam disk and of the cam follower coincides with the central axis FIG. 5 Diagrammatic representation of a preferred embodiment of the cam mechanism with a doubled axial offset between the central axis, the rotation axis of the cam disk and the rotation axis of the cam follower FIG. 6 Diagrammatic representation of a preferred embodiment of the cam mechanism, wherein the slope of the radius in the spiral-shaped section is increased in comparison to the embodiment according to FIG. 1-3
Figure 2:
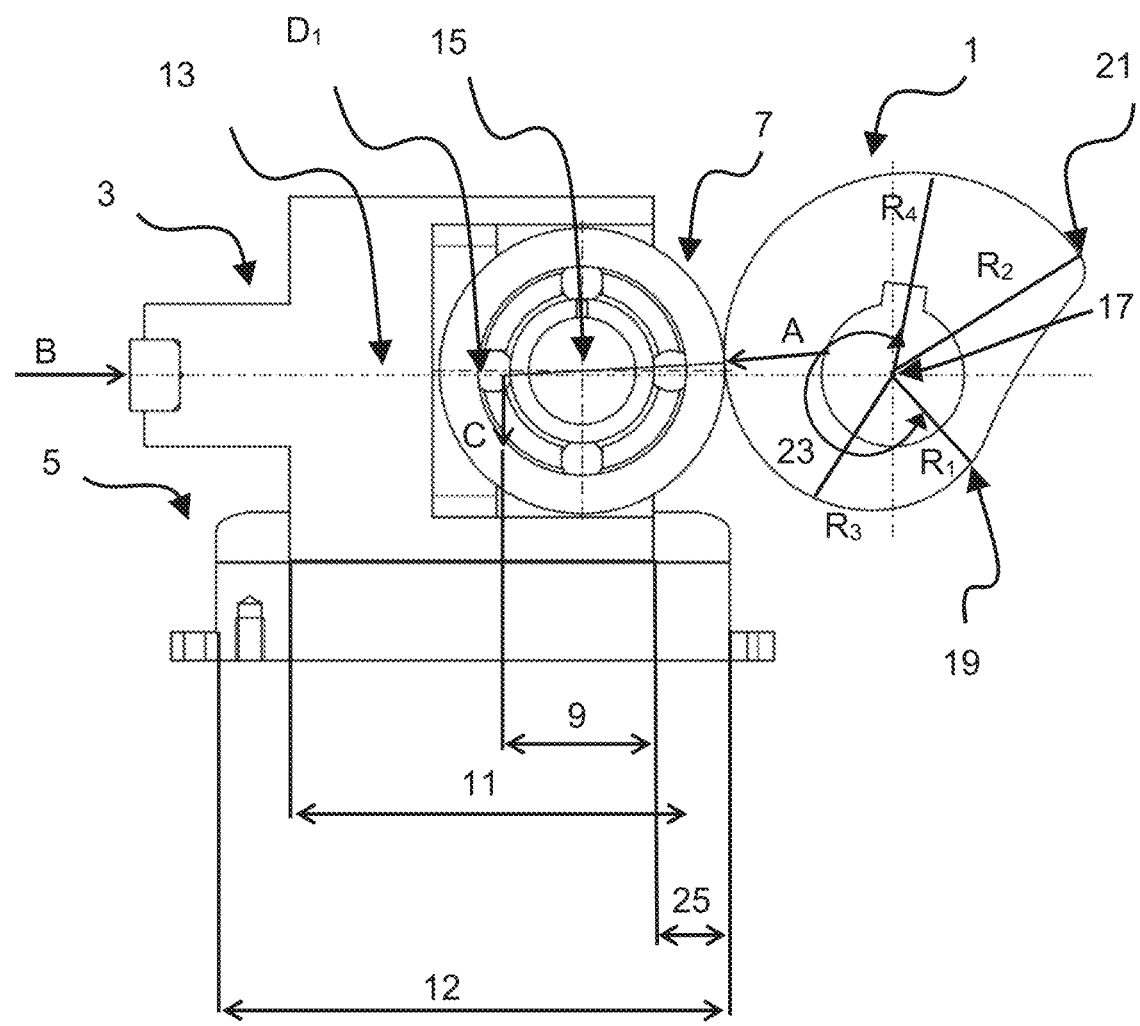
Figure 3:
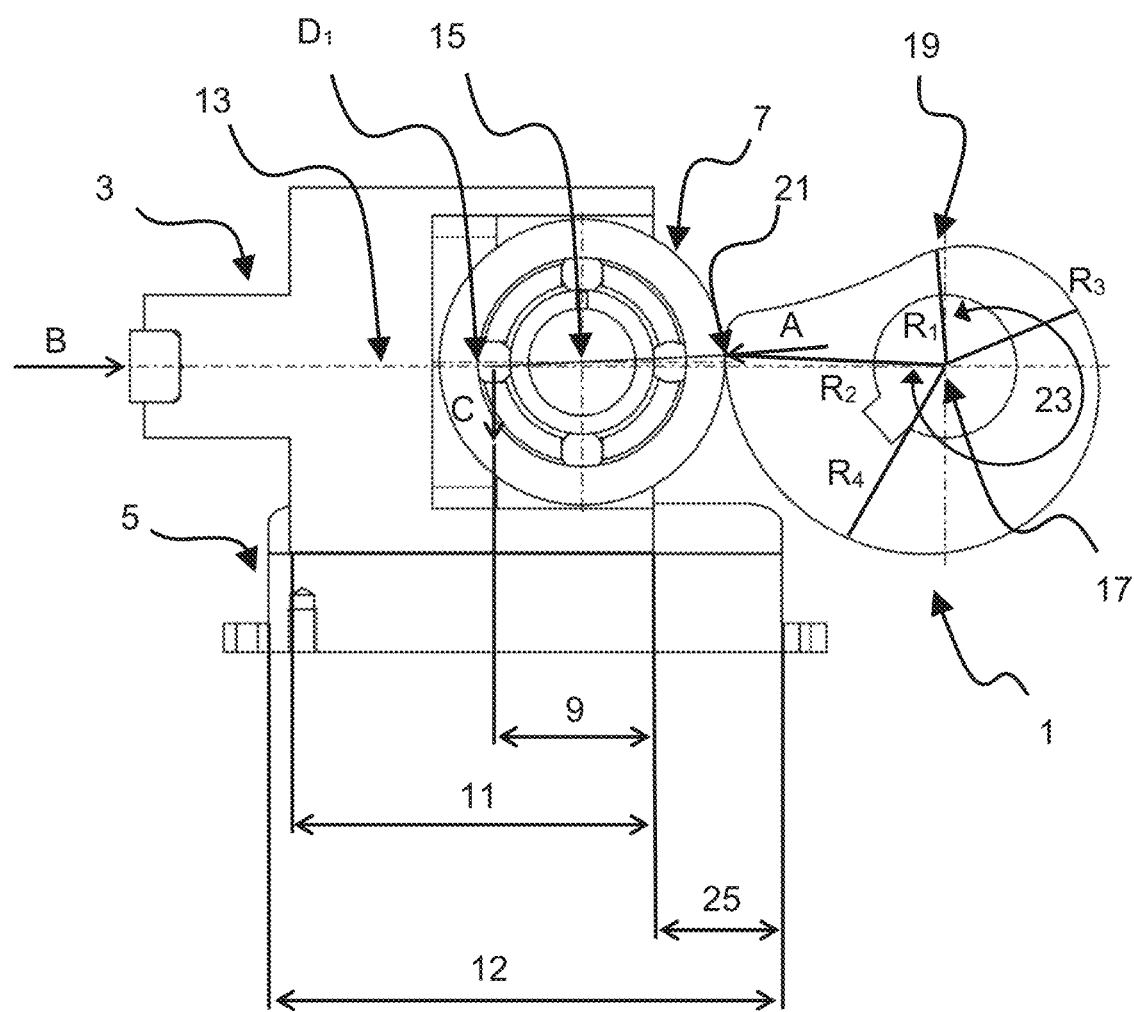

FIG. 1-3 show a preferred embodiment of the cam mechanism, wherein the cam disk 1 is shown in different positions, so that the movement of the slider 3 is illustrated.

The preferred embodiment of the cam mechanism has a cam follower 7 against which the cam disk 1 is applied. The cam follower 7 is connected to a slider 3 which can move axially with a sliding surface 11 along the contact surface 12 of a linear guide 5.

The rotation axis of the cam disk 17, on the other hand, is stationary with respect to the linear guide 5. Therefore, by rotation of the cam disk 1, the slider 3 is moved axially within the linear guide 5 in accordance with the shape of the margin of the cam disk 1.

The circumference of the cam disk 1 has a spiral-shaped section. At the start of the spiral-shaped section 19, the radius of the cam disk 1 is $R_1$. In the preferred embodiment shown, the radius of the circumference of the cam disk 1 increases linearly with the rotation angle, until it reaches a radius $R_2$ at the end of the spiral-shaped section 21. For the performance of an oscillating movement of the slider 3, the cam disk 1 performs an oscillating movement between the positions represented in FIG. 1-3. For this purpose, it is preferable that the cam disk 1 is connected to a drive-side shaft which performs, via a motor, an oscillating rotation movement (swiveling movement).

In FIG. 1, the cam disk 1 is applied against the cam follower 7 in the position which corresponds to the start of the spiral-shaped section 19. Since the circumference in this position has the smallest radius $R_1$, the slider 3 is in the maximum retracted position. In the embodiment shown, this corresponds to a movement position 25 of the slider at 2.8 mm. In the represented embodiment, the total length of the sliding surface is 51 mm and the total length of the contact surface of the linear guide is 72 mm. The radius of the cam follower is 20 mm, wherein $R_1$ is 16 mm and $R_2$ is 31 mm.

FIG. 2 shows the positioning of the slider 3 and of the cam disk 1 after said cam disk has been rotated by a swiveling angle of 145°. This corresponds to half the maximum swiveling angle possible for the preferred embodiment within the spiral-shaped section. The opening angle 23 of the spiral-shaped section is 290°. In the swiveling position shown in FIG. 2, the slider 3 accordingly is in a half-extended movement position 25 at 10.45 mm.

FIG. 3 shows the cam mechanism after the cam disk 1 has been rotated by an additional swiveling angle of 145° along the spiral-shaped section. In this position, the cam disk 1 is applied to the cam follower 7 with a radius $R_2$ which corresponds to the end of the spiral-shaped section 21. In comparison to FIG. 1, the cam disk has been rotated by the maximum swiveling angle of 290° for the embodiment, which corresponds to the opening angle 23 of the spiral-shaped section. FIG. 3 thus shows the slider 3 in the maximum extended position. Said extended position corresponds in the example to a movement position 25 at 18.11 mm.

In order to set the slider 3 into an oscillating linear movement, the cam disk 1 is rotated between the positions represented in FIGS. 1 and 3 of the reversal points of the swiveling movement. The maximum retracted position (FIG. 1) and the maximum extended position (FIG. 3) correspond to the dead points of the oscillating movement of the slider 3, wherein the converted stroke corresponds to the difference between $R_2$ and $R_1$. In the present example, a stroke of 15.3 mm has been implemented. The linear increase between $R_1$ and $R_2$ over the maximum swiveling angle of 290° is 0.053 mm/°. In order to achieve a movement of the slider 3 with a different stroke, the swiveling movement can be selected so that the reversal points are located between the start of the spiral-shaped section 19 and the end of the spiral-shaped section 21.

In the preferred embodiment, the rotation axis of the cam disk 17 and the central axis 13, i.e., the force exertion axis of the slider 3 lie in a plane, while the rotation axis of the cam follower 15 is offset vertically upward by an axial offset $D_1$. As shown in FIG. 1, the radial force A: acting from the cam follower 7 onto the cam disk 1 forms an angle with the axial force B leading to the shifting of the slider 3 and extending along the force exertion axis 13, such that a transverse force C acts on the slider 3, pressing said slider vertically downward into the contact surface of the linear guide 12. For the present example, the axial offset is 0.6 mm and the distance 9 of the transverse force C from the start of the sliding surface 3 has a value of 19 mm. As can be seen in FIG. 1, the transverse force C acts in the center on the slider 3, so that said slider undergoes a stable guiding in the linear guide 5.

The person skilled in the art knows that, by selecting the axial offset $D_1$, the position 9 of the transverse force C within the sliding surface 11 can be shifted. Thus, an increase in the axial offset $D_1$ leads to a shifting of the position 9 of the transverse force C towards the rear end of the sliding surface 11. The rear end refers to the side facing away from the cam disk, while the front end denotes the end facing the cam disk. For example, for an axial offset of $D_1=1$ mm, other parameters remaining unchanged, the transverse force C would lie in a position at 28.1 mm. In contrast, a decrease of the axial offset $D_1$ would lead to a shifting of the position 9 of the transverse force C towards the front end of the sliding surface 11. I.e., for example, for an axial offset of $D_1=0.3$ mm, other parameters remaining unchanged, the transverse position C would be in a position at 14 mm.

In the preferred embodiment of FIG. 1-3, the spiral-shaped section has a linear rise of the radius from $R_1$ to $R_2$. As a result, the position 9 of the transverse force C also advantageously remains nearly constant during the swiveling movement. In a half-extended position of the slider 3 according to FIG. 2, the position 9 of the transverse force C is at 20.8 mm in the example shown. In the case of a fully extended position of the slider 3 according to FIG. 3, the position 9 of the transverse force C is at 22.7 mm.

In the preferred embodiment, over the entire range of the spiral-shaped section, a particularly central positioning of the transverse force C can thus be achieved, which enables a particularly stable guiding of the slider 3 in the linear guide 5.

It is pointed out that the mentioned parameter variables for the position 9 of the transverse force C and for the axial offset $D_1$ are merely intended to illustrate exemplary preferred embodiments of the invention. There is no limitation due to the parameters. The person skilled in the art knows that other parameters for the axial offset or the difference between R1 and R2 can be selected, which also lead to advantageous solutions.

Figure 4:
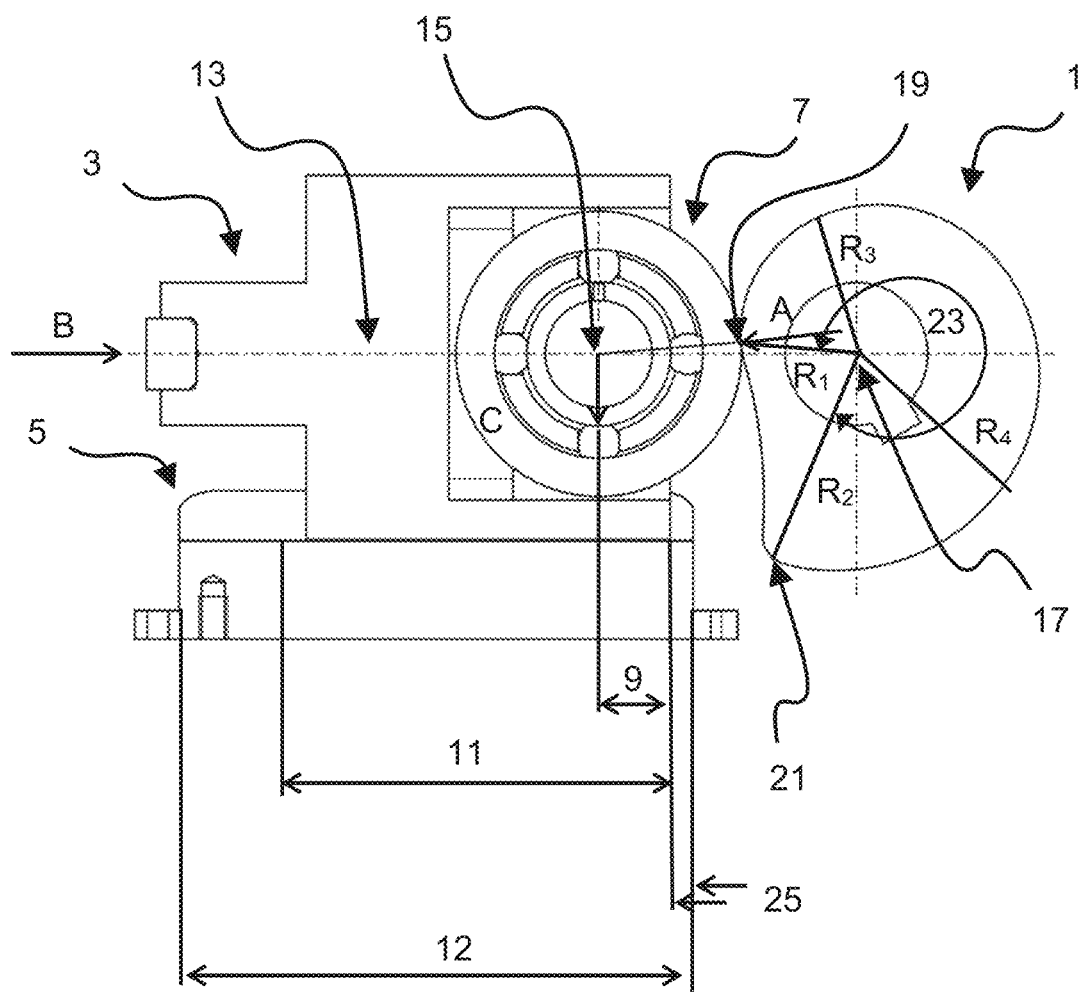

FIG. 4 shows an additional embodiment of the cam mechanism, wherein the rotation axis of the cam disk 17 and the rotation axis of the cam follower 15 coincide with the central axis 13. I.e., in contrast to the embodiment of the cam mechanism according to FIG. 1-3, there is no axial offset in this embodiment of the invention. The shape of the margin of the cam disk 1 and, in particular, of the spiral-shaped section is identical to the embodiment of FIG. 1-3. Due to the linear increase of 0.053 mm/° in the spiral-shaped section, the cam follower 7 exerts a radial force A onto the cam disk 1. Said radial force forms an angle with the axial force B, so that the slider 3 is exposed to a vertically downward transverse force C at the position 9. In this embodiment without axial offset as well, the slider 3 is thus advantageously pressed into the contact surface by a transverse force C. In the example, the position of the transverse force C is 10 mm. In contrast to the embodiment according to FIG. 1-3, the transverse force C is positioned less centrally. The embodiment according to FIG. 4 is suitable according to the invention; however, in comparison to the embodiment according to FIG. 1-3, it has a lower degree of tolerance with respect to deviations in the manufacturing. Due to the asymmetric positioning of the transverse force C with respect to the center of the sliding surface 11, this embodiment for the parameters shown is more susceptible to tilting movements of the slider 3.

Figure 5:
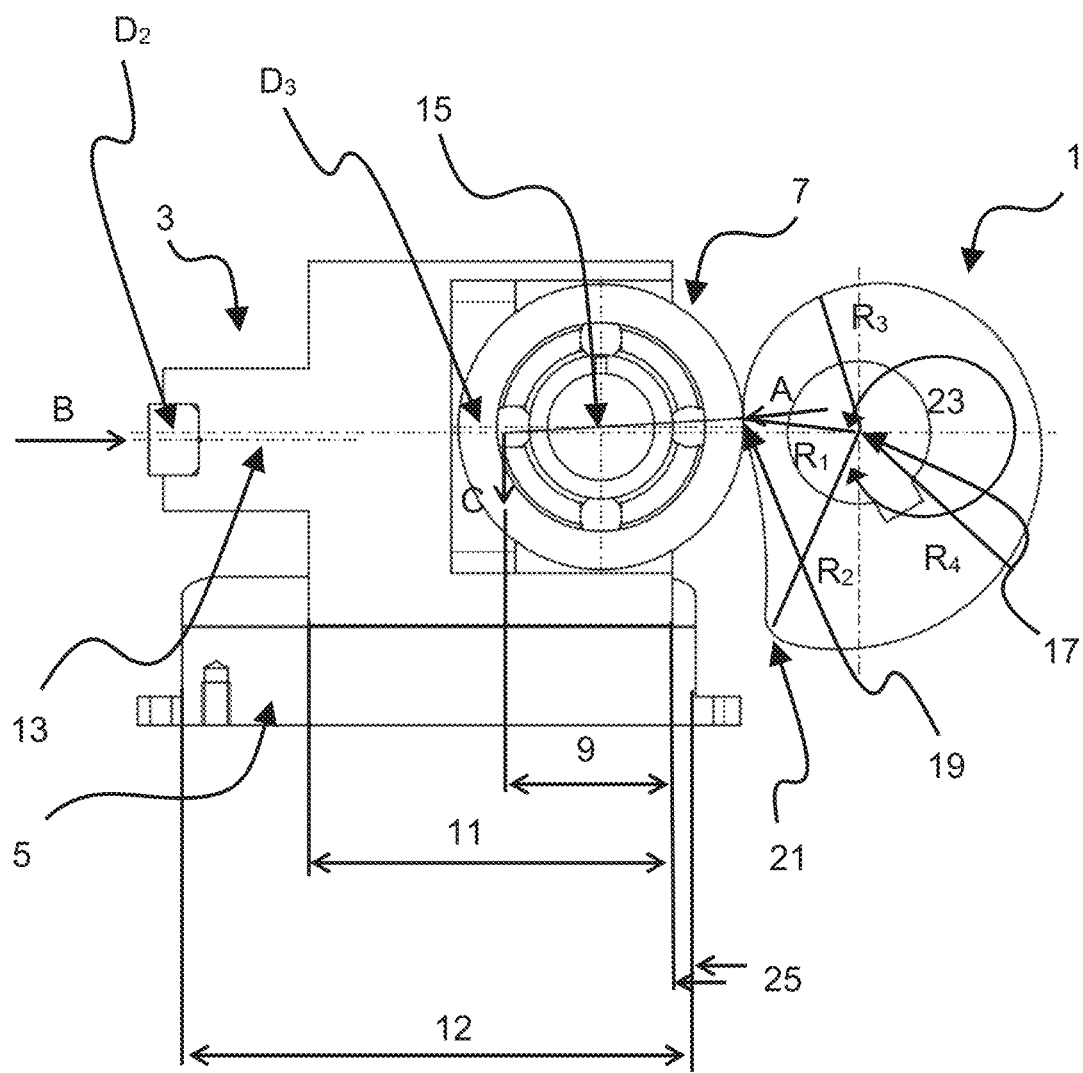

FIG. 5 shows a diagrammatic representation of another preferred embodiment of the cam mechanism, wherein said cam mechanism is characterized by a doubled axial offset between the central axis 13, the rotation axis of the cam disk 17 and the rotation axis of the cam follower 15. In the embodiment, the rotation axis of the cam disk 17 is shifted vertically upward by the vertical offset $D_2$ with respect to the central axis 13, i.e., the force exertion axis for the axial force B. In addition, the rotation axis of the cam follower 15 is offset vertically upward by the distance $D_3$ with respect to the rotation axis of the cam disk 17. The shape of the circumference of the cam disk 1 and in particular of the spiral-shaped section is identical to the embodiment according to FIG. 1-3. By means of the doubled axial offset, it is also possible to achieve advantageously a transverse force C onto the slider 3, which presses said slider vertically and at the center into the contact surface of the linear guide 12. For the example shown, $D_2$ is 1 mm and $D_3$ is 0.8 mm. For these parameter values, this results in a position 9 of the transverse force C at 23.3 mm.

A doubled axial offset can thus also advantageously achieve a particularly central positioning of the transverse force C in the sliding surface 11.

Figure 6:
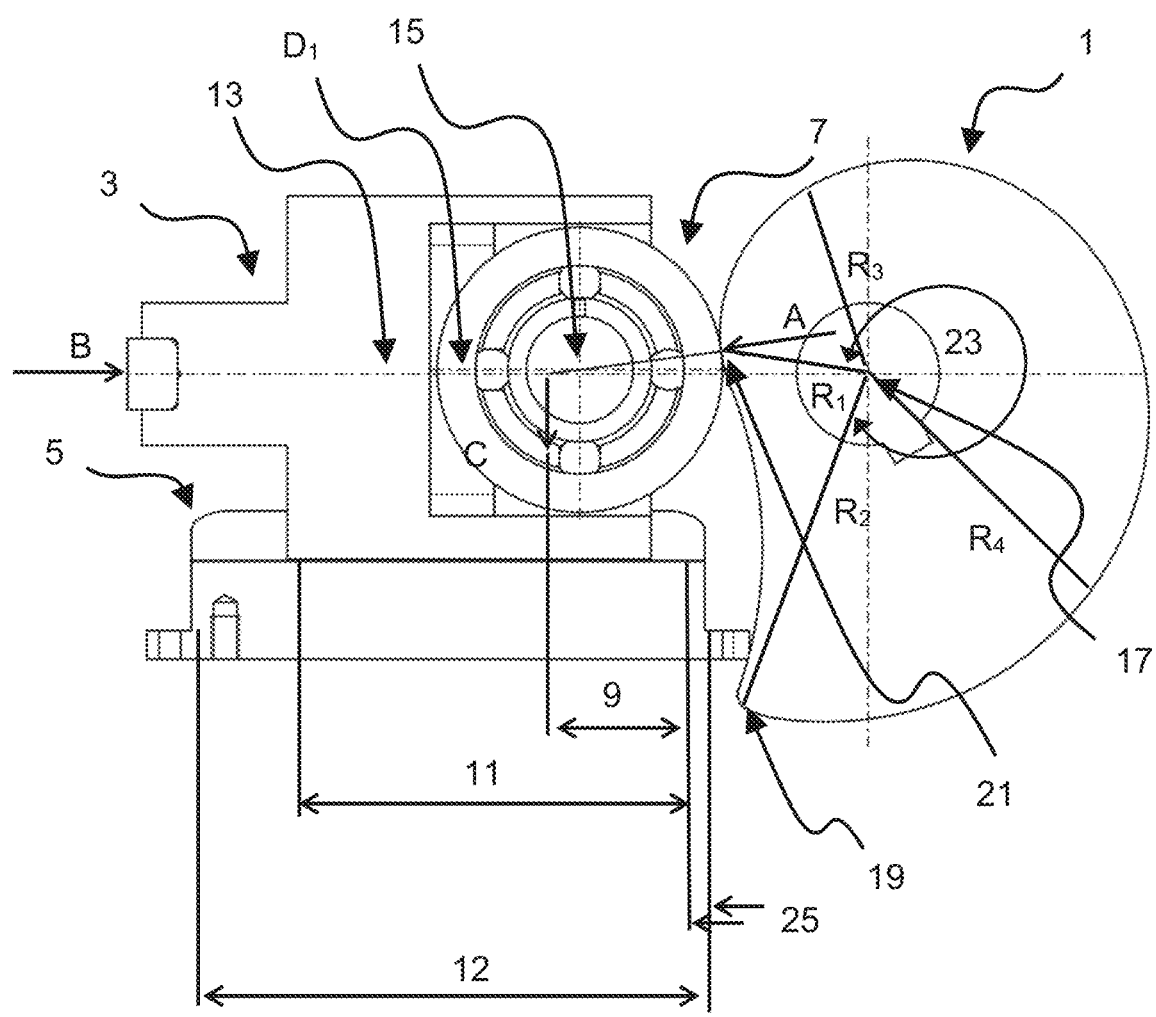

FIG. 6 shows a diagrammatic representation of a preferred embodiment of the cam mechanism, wherein the slope of the radius in the spiral-shaped section is increased in comparison to the embodiment according to FIG. 1-3. In the example shown, by means of a linear increase of the radius of the cam disk 1 in the spiral-shaped section of 0.1055 mm/°, a stroke of 30 mm is implemented. Analogously to FIG. 1-3, the rotation axis of the cam disk 17 and the central axis 13 are located on a line, wherein the rotation axis of the cam follower 15 is offset vertically upward by a distance $D_1$. In the example shown, $D_1$ is 0.6 mm. This results in a transverse force C which is in a position 9 at 14.1 mm. Due to the increased linear increase in comparison to the embodiment of FIG. 1-3, the transverse force C has thus moved in a direction towards the front end of the sliding surface 11. While this embodiment is suitable for a stable guiding of the slider 3, it can be preferable to also increase the axial distance $D_1$ for the increased linear increase of the radius in the spiral-shaped section. This leads to a shift of the position 9 of the transverse force C towards the end of the sliding surface 11. For example, in the case of an axial offset $D_1$ of 1.5 mm and otherwise unchanged parameters, the position 9 of the transverse force C would be 22.5 mm.

FIG. 1-6 illustrate several different embodiments of the cam mechanism according to the invention, wherein it can be particularly preferable to select the arrangement of the components in such a manner that the slider 3 is exposed to a transverse force C which presses said slider into the contact surface of the linear guide 5.

Figure 7:
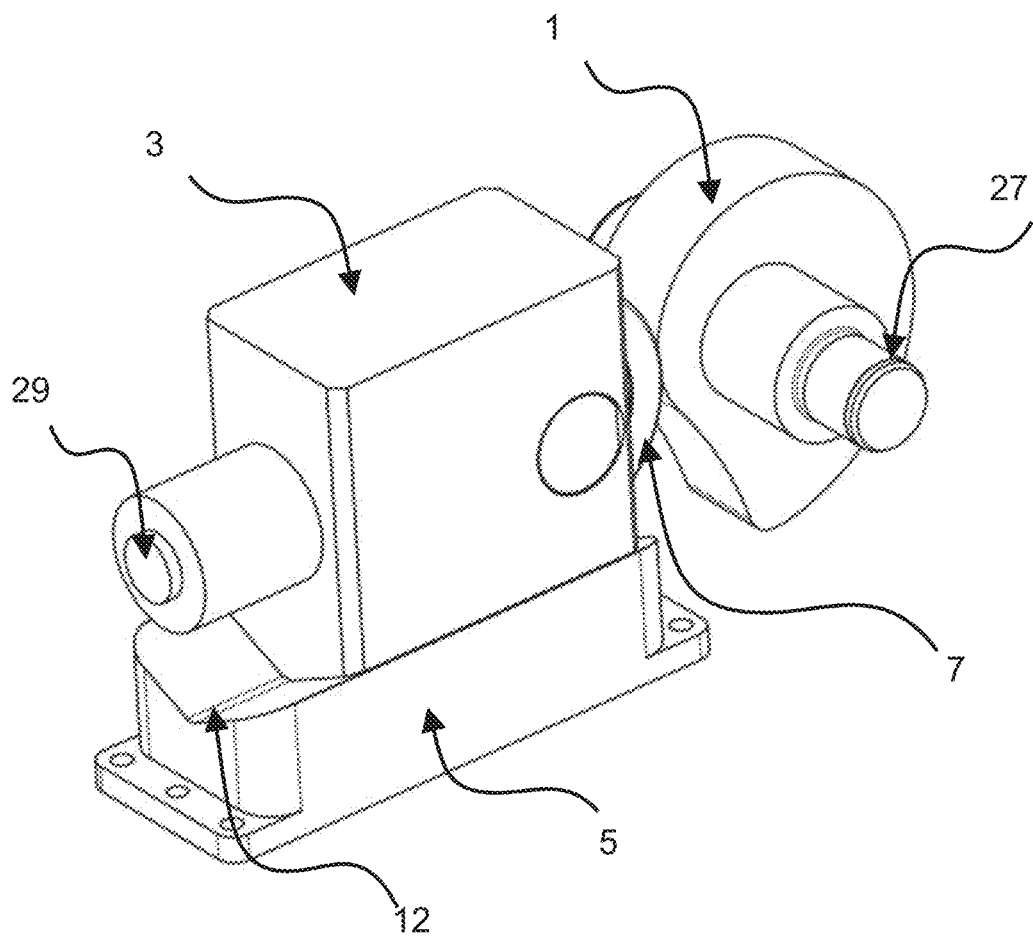
FIG. 7 Diagrammatic representation of a preferred embodiment of the cam mechanism to illustrate a v-shaped contact surface of the linear guide

FIG. 7 shows a three-dimensional diagrammatic representation of a preferred embodiment of the cam mechanism, whereby the advantageous v-shaped contact surface of the linear guide 12 is illustrated. The cam disk 1 can be set in a swiveling movement by a drive-side shaft 27 in order to drive a piston pump. For this purpose, a cam follower 7 is present at a front end of a slider 3 which can perform a translation in a linear guide 5. In accordance with the shape of the circumference of the cam disk 1, due to the swiveling movement, an oscillating axial movement of the slider 3, which is in contact with a piston, is brought about. Reference numeral 29 marks the contact surface for the piston. As illustrated in FIG. 1-6, for example, it is preferable that the arrangement of the components of the cam mechanism occurs in such a manner that a vertical force acts onto the slider 3 downward into the contact surface 12 of the linear guide. Due to the v-shaped design of the contact surface 12 of the linear guide and to the matchingly shaped sliding surface 11, a particularly stable guiding of the slider 3 is possible. Thus, the v-shaped contact surface 12 prevents lateral movements of the slider 3 and ensures a nearly play-free guiding of the slider 3 in the linear guide 5. In addition, tolerances, for example, by a lateral asymmetric exertion of the forces due to manufacturing defects, can be compensated particularly effectively. The particularly play-free embodiment allows a reduction of wear, in addition to an extremely stable and disturbance-free movement flow of the slider 3.

It is pointed out that different alternatives to the described embodiments of the invention can be used in order to carry out the invention and reach a solution according to the invention. The cam mechanism according to the invention, the piston pump according to the invention as well as the use thereof in the described method are thus not limited in their designs to the above preferred embodiments. Instead, numerous design variants are conceivable, which can deviate from the solution represented. The aim of the claims is to define the scope of protection of the invention. The scope of protection of the claims aims to cover the cam mechanism according to the invention, the piston pump according to the invention and the preferred method for the use thereof as well as equivalent embodiments thereof.

LIST OF REFERENCE NUMERALS

1 Cam disk
3 Slider
5 Linear guide
7 Cam follower
9 Position of the transverse force C, i.e., distance from the transverse force C to the start of the sliding surface
11 Sliding surface
12 Contact surface of the linear guide
13 Central axis (or force exertion axis)
15 Rotation axis of the cam follower
17 Rotation axis of the cam disk
19 Start of the spiral-shaped section
21 End of the spiral-shaped section
23 Opening angle of the spiral-shaped section
25 Movement position of the slider
27 Drive-side shaft
29 Contact surface for a piston
$R_1$ Radius of the cam disk at the start of the spiral-shaped section
$R_2$ Radius of the cam disk at the start of the spiral-shaped section
A Radial force
B Axial force
C Transverse force
$D_1$ Axial offset between the rotation axis of the cam follower and the rotation axis of the cam disk or central axis
$D_2$ Axial offset between the central axis and the rotation axis of the cam disk
$D_3$ Axial offset between the rotation axis of the cam disk and the rotation axis of the cam follower

The invention claimed is:

1. A piston pump for high performance liquid chromatography, the piston pump comprising:
    a cam mechanism configured to convert a rotational movement of a drive-side shaft into a linear output movement, the cam mechanism comprising:
        a) a cam disk attached to the drive-side shaft,
        b) a slider configured to be shifted in a linear guide at least in sections, and
        c) a cam follower which is applied against a circumferential surface of the cam disk, whereby a rotational movement of the cam disk leads to a linear output movement of the slider in the linear guide, wherein
        the circumference of the cam disk is designed as spiral-shaped at least in sections, and the radius of the cam disk increases monotonically in the spiral-shaped section from a start radius $R_1$ to an end radius $R_2$ along a rotational direction;
    a motor configured to drive a drive-side shaft, the drive-side shaft connected to the cam disk;
    a motor controller; and
    a piston attached axially on an end of the slider facing away from the cam follower, wherein the motor controller is configured so that the cam disk performs a back and forth rotational movement between two reversal points with radial distances $R_3$ and $R_4$, wherein $R_1 < R_3 < R_4 < R_2$ and the slider performs an axial movement with a stroke corresponding to a difference between $R_4$ and $R_3$.

2. The piston pump according to claim 1, wherein a difference $R_2 - R_1$ is between 1.5 mm and 50 mm.

3. The piston pump according to claim 1, wherein, in the spiral-shaped section, the radius of the cam disk increases linearly with a rotational angle.

4. The piston pump according to claim 1, wherein the spiral-shaped section of the cam disk extends over an opening angle between 90° and 340°.

5. The piston pump according to claim 1, wherein in the spiral-shaped section, the radius of the cam disk increases linearly with a rotational angle, and the linear increase is between 0.005 mm/° and 0.5 mm/°.

6. The piston pump according to claim 1, wherein a contact surface of the linear guide for receiving the slider and an opposite-shaped matching sliding surface of the slider comprise a downward directed narrowing with a symmetry plane which coincides with a central axis of the slider.

7. The piston pump according to claim 1, wherein a contact surface of the linear guide for receiving the slider and an opposite-shaped matching sliding surface of the slider are v-shaped in cross section.

8. The piston pump according to claim 1, wherein an arrangement of the cam follower, of the cam disk and of the slider is present such that, for a region of a rotational movement, while the cam follower is applied against the cam disk in the spiral-shaped section, a radial force A acts from the cam follower onto the cam disk, forming an angle with the axial force B leading to the shifting of the slider, such that a transverse force C presses the slider in an area of the sliding surface vertically downward into a contact surface of the linear guide.

9. The piston pump according to claim 1, wherein a rotation axis of the cam disk lies in a plane of a central axis of the slider, and a rotation axis of the cam follower is offset vertically upward by a distance $D_1$ relative to the central axis of the slider.

10. The piston pump according to claim 1, wherein a rotation axis of the cam disk is offset vertically upward by a distance $D_2$ relative to a central axis of the slider, and a rotation axis of the cam follower is offset vertically upward by a distance $D_3$ with respect to the rotation axis of the cam disk.

11. A method of using a cam mechanism for converting a rotational movement of a drive-side shaft into a linear output movement, the cam mechanism comprising:
  a) a cam disk that can attach to the drive-side shaft,
  b) a slider that can be shifted in a linear guide at least in sections, and
  c) a cam follower which is applied against the circumferential surface of the cam disk, so that a rotational movement of the cam disk leads to a linear output movement of the slider in the linear guide, wherein the circumference of the cam disk is designed as spiral-shaped at least in sections, and the radius of the cam disk increases monotonically in the spiral-shaped section from a start radius R1 to an end radius R2 along a rotational direction for driving a piston pump
  the method comprising:
  rotating the cam disk back and forth between first and second reversal points while the cam follower is applied against the cam disk in the spiral-shaped section, so that the piston is shifted linearly between two dead points, wherein, by determination of the reversal points, a predetermined piston stroke is set, which corresponds to a difference between the radius of the cam disk at a first reversal point $R_3$ and the radius of the cam disk at a second reversal point $R_4$.

12. The piston pump according to claim 1, wherein the difference $R_2-R_1$ is between 5 mm and 30 mm.

13. The piston pump according to claim 1, wherein the difference $R_2-R_1$ is between 10 mm and 20 mm.

14. The piston pump according to claim 1, wherein the spiral-shaped section of the cam disk extends over an opening angle between 220° and 330°.

15. The piston pump according to claim 1, wherein the radius of the cam disk in the spiral-shaped section increases linearly with a rotational angle, and the linear increase is between 0.02 mm/° and 0.2 mm/°.

16. The piston pump according to claim 1, wherein the radius of the cam disk in the spiral-shaped section increases linearly with a rotational angle, and the linear increase is between 0.03 mm/° and 0.08 mm/°.

17. The piston pump according to claim 1, wherein a contact surface of the linear guide for receiving the slider and the opposite-shaped matching sliding surface of the slider are v-shaped in cross section, with an angle of between 30° and 170°.

18. A cam mechanism for converting a rotational movement of a drive-side shaft into a linear output movement, the cam mechanism comprising:
  a) a cam disk configured to be attached to the drive-side shaft;
  b) a slider configured to be shifted in a linear guide at least in sections; and
  c) a cam follower which is applied against a circumferential surface of the cam disk, so that a rotational movement of the cam disk leads to a linear output movement of the slider in the linear guide, wherein a circumference of the cam disk is designed as spiral-shaped at least in sections, and a radius of the cam disk increases monotonically in the spiral-shaped section from a start radius R1 to an end radius R2 along a rotational direction,
  wherein a contact surface of the linear guide for receiving the slider and an opposite-shaped matching sliding surface of the slider comprise a downward directed narrowing with a symmetry plane which coincides with a central axis of the slider, and wherein
  (a) a rotation axis of the cam disk lies in the plane of the central axis of the slider, and a rotation axis of the cam follower is offset vertically upward by a distance $D_1$ relative to the central axis of the slider, or
  (b) a rotation axis of the cam disk is offset vertically upward by a distance $D_2$ relative to the central axis of the slider, and a rotation axis of the cam follower is offset vertically upward by a distance $D_3$ relative to the rotation axis of the cam disk.

19. The cam mechanism according to claim 18, wherein the contact surface of the linear guide for receiving the slider and the opposite-shaped matching sliding surface of the slider are v-shaped in cross section.

20. The cam mechanism according to claim 19, wherein the contact surface of the linear guide for receiving the slider and the opposite-shaped matching sliding surface of the slider are v-shaped in cross section with an angle of between 30° and 170°.

* * * * *